June 9, 1942.　　　N. E. WAHLBERG　　　2,285,954
SPRING SUSPENSION
Filed Jan. 6, 1940　　　5 Sheets-Sheet 1
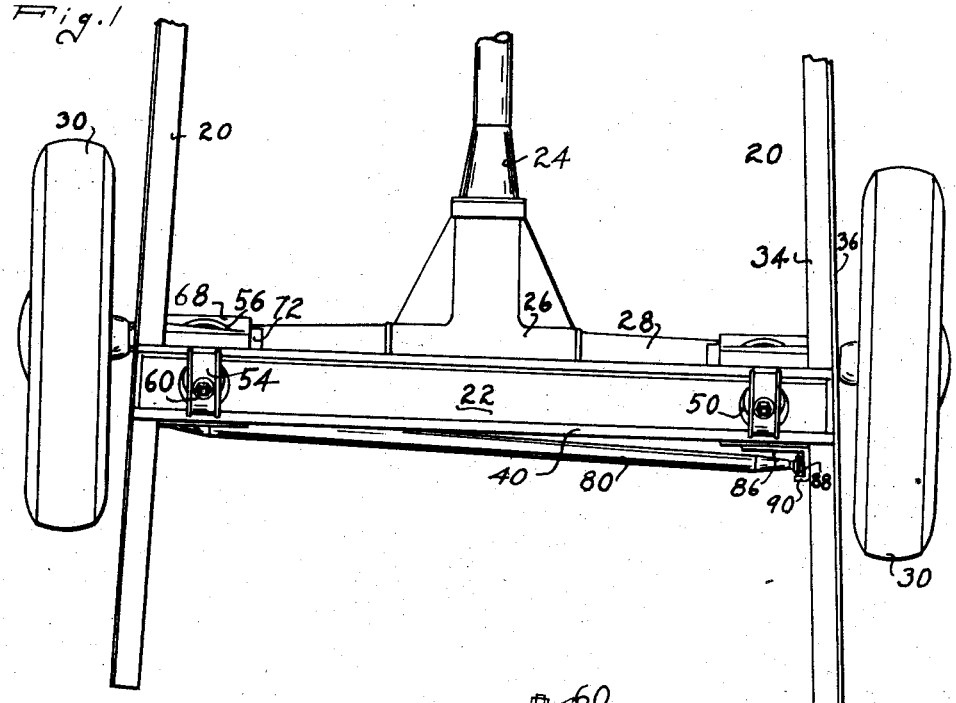
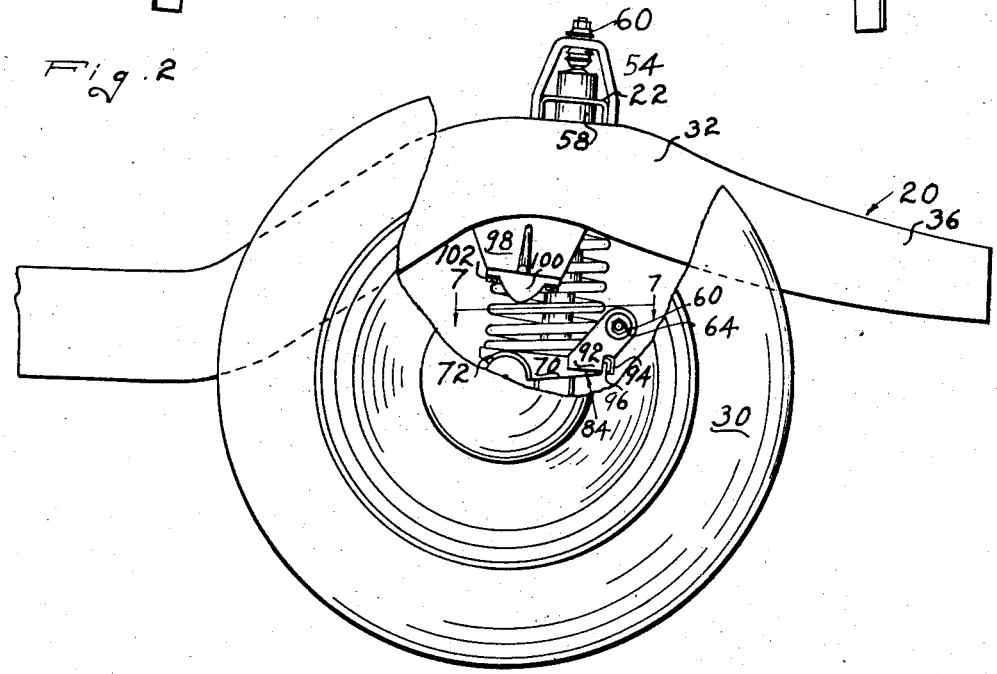
INVENTOR.
NILS ERIK WAHLBERG.
BY
ATTORNEY.

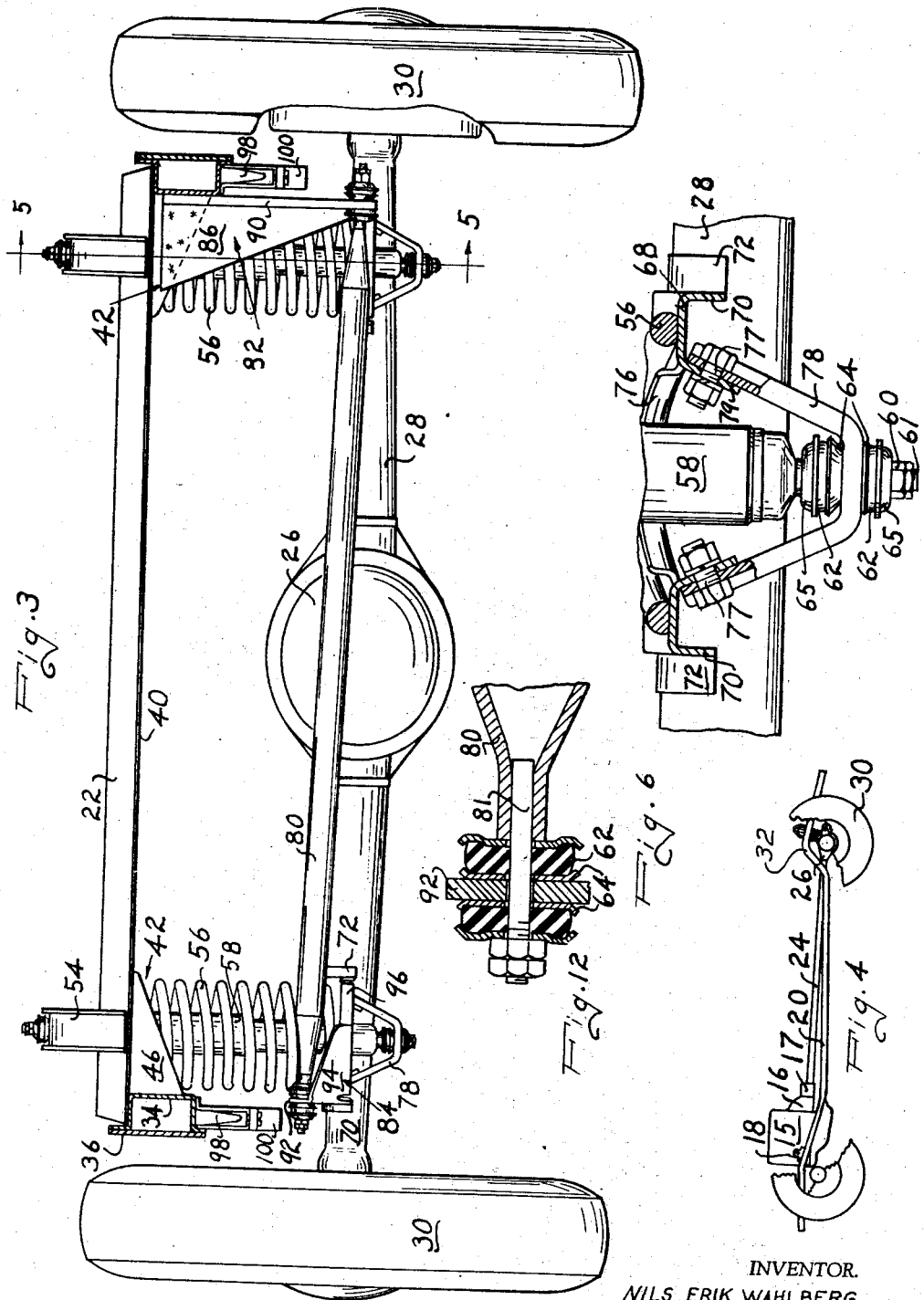

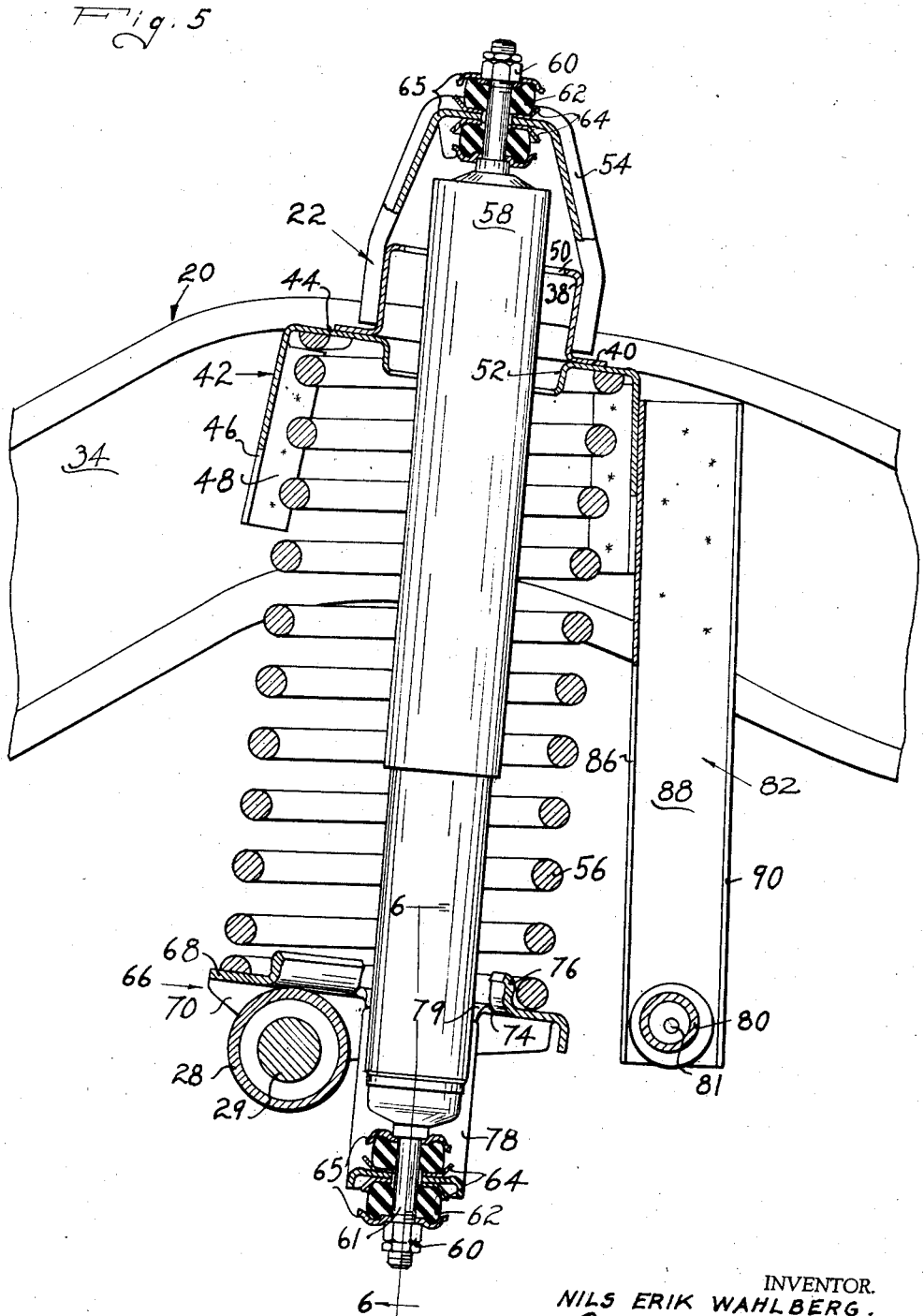

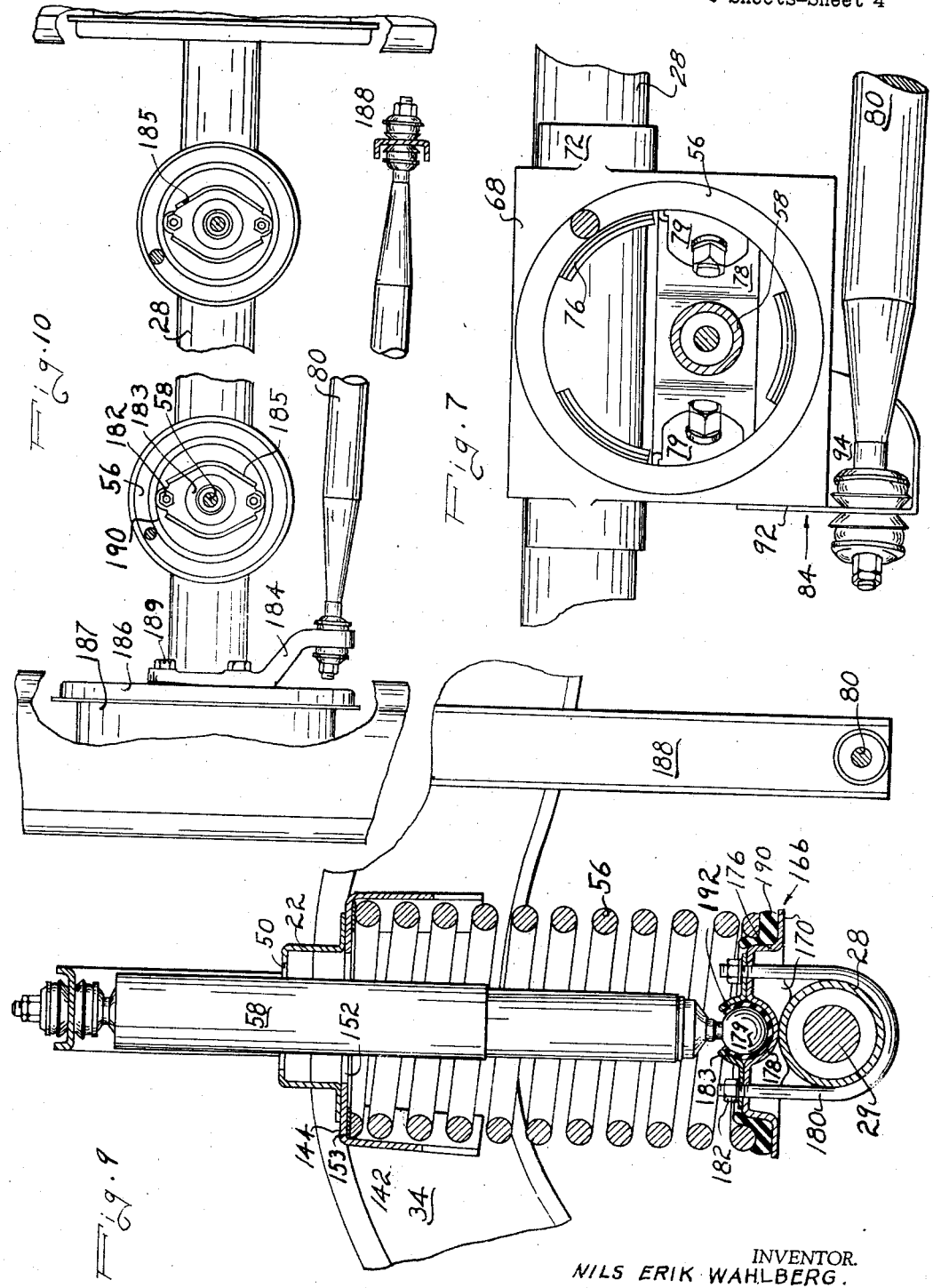

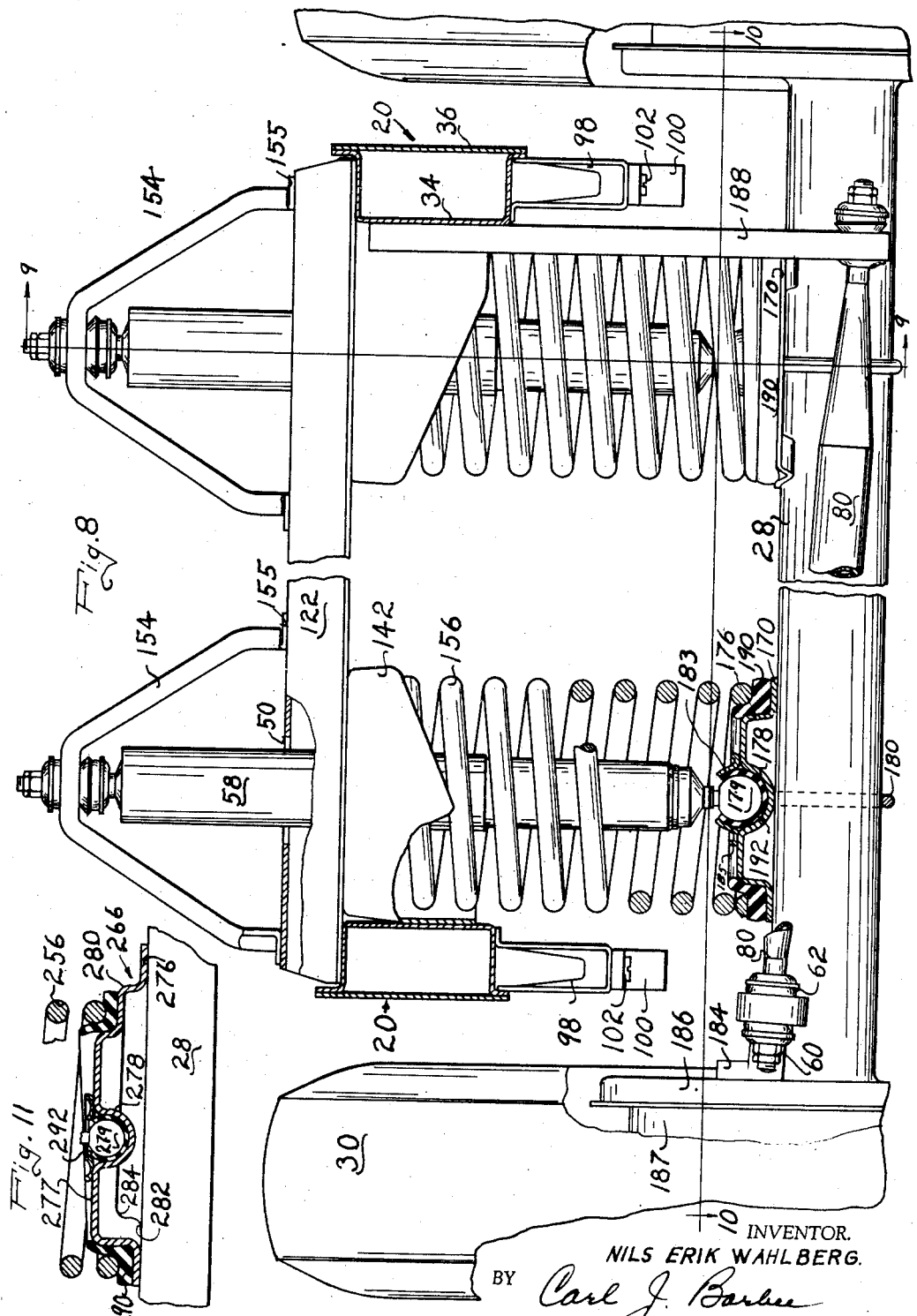

Patented June 9, 1942

2,285,954

UNITED STATES PATENT OFFICE 2,285,954

SPRING SUSPENSION

Nils Erik Wahlberg, Kenosha, Wis., assignor to Nash-Kelvinator Corporation, Kenosha, Wis., a corporation of Maryland Application January 6, 1940, Serial No. 312,655

4 Claims. (Cl. 280—124)

This invention relates to automotive spring suspensions and has particular reference to a method of supporting one end of an automobile over an axle by means of coil springs.

It is an object of this invention to provide a type of coil spring suspension using a simplified frame.

It is another object of this invention to provide a type of coil spring suspension particularly adapted to use with a rigid driving unit.

It is another object of this invention to provide a novel method of installing coil springs and shock absorbers.

It is another object of this invention to provide simple and novel means for supporting a coil spring upon an axle.

It is another object of this invention to provide a coil spring mount particularly adapted for combination with a shock absorber having a long path of travel.

It is another object of this invention to provide a system of coil spring and shock absorber mounting in which means are provided for preventing transmission of vibration from the wheels to the car frame.

It is another object of this invention to provide a method of mounting coil springs and shock absorbers which requires less space than mountings used heretofore.

It is another object of this invention to provide a novel type of sway bar construction for use with coil spring mounting.

Other objects and advantages of this invention will be apparent upon consideration of the following specification and the attached drawings of which there are five sheets and in which Figure 1 represents a plan view of the rear axle, wheels and the rear portion of the frame of an automobile;

Figure 2 represents a side elevation of the structure illustrated in Figure 1;

Figure 3 represents a rear elevation of the structure illustrated in Figure 1;

Figure 4 represents a broken away elevation of an automobile chassis embodying my invention;

Figure 5 represents a section taken along the line 5—5 of Figure 3 and looking in the direction of the arrows;

Figure 6 represents a section taken along the line 6—6 of Figure 5 and looking in the direction of the arrows;

Figure 7 represents a section taken along the line 7—7 of Figure 2 and looking in the direction of the arrows;

Figure 8 represents a partially broken away rear elevation of a modified type of suspension;

Figure 9 represents a section taken along the line 9—9 of Figure 8;

Figure 10 represents a section taken along the line 10—10 of Figure 8;

Figure 11 represents a partial section through a rear spring showing a modified type of spring seat;

Figure 12 represents a section through the sway bar showing the connection between the bar and its supporting brackets.

I have shown (see Figures 1, 2, 3 and 4) an automobile having a motor 15 with clutch housing 16 and transmission housing 17. The motor 15, clutch housing 16 and transmission housing 17 are cast as a single rigid unit and are supported by suitable motor mounts 18 on the side frame members 20. The side members 20 are connected toward the rear of the car by a cross member 22 which is supported over the drive shaft housing 24, differential housing 26 and the rear axle housing 28. Wheels 30 are mounted at the ends of the rear axle housing.

The drive shaft housing 24 is rigidly connected to the rear axle housing 28 and extends forward to the transmission housing 17 to which it is rigidly attached. Driving force from the wheels 30 is transmitted through the axle housing to the drive shaft housing which in turn transmits the force to the transmission and engine block which is fixed to the car frame and body. While I have illustrated this invention as particularly applicable in combination with a driving unit of the type disclosed in the copending application of myself and Meade F. Moore, Serial No. 271,464, filed May 3, 1939, now Patent No. 2,257,630, granted September 30, 1941, it may also be used to advantage with a driving unit in which the rear axle differential, torque tube, and motor unit are arranged for limited relative movement.

The side members 20 are each provided with a kick up 32 in the vicinity of the rear axle and are box shaped in cross section having a flanged channel member 34 closed by the plate 36. The cross member 22 is in the shape of a channel having downwardly extending flanges 38 which terminate in the outwardly bent flanges 40. The flanges 40 rest on the horizontal upper portions of channel members 34 of the side frame members and are welded thereto.

The connection between the cross member 22 and the side members 20 is strengthened by the brackets 42 (see Figures 3 and 5) which have a top portion 44 welded to the flanges 40 on the cross member and side flanges 46 connecting with the end flanges 48 which are welded to the vertical portions of the channel members 34.

Each end of the cross member 22 is provided with a hole 50 and the top wall 44 of the bracket 42 is provided with a flanged opening 52 in alignment with the hole 50. Positioned over the hole 50 is a U-shaped member 54 channel shaped in cross section, the legs of which are welded at their ends to the sides of the cross member 22. The under surface of the portion 44 of the bracket 42 forms an abutment for a coiled spring 56 which is arranged coaxially with the opening 52 and the hole 50. Telescopically arranged within the spring 56 is a hydraulic shock absorber 58 of the strut type which extends upwardly through the opening 52 and the hole 50 and is fastened to the bracket 54 by means of the bolt and lock nut assembly 60. I have provided rubber gaskets 62 which fit around the bolt on the shock absorber on each side of the bracket 54. Two cup shaped metal washers 64 are positioned one against each surface of the bracket 54 to protect the gaskets from wear and to distribute the forces in the shock absorber throughout the gaskets. The outside metal washers 65 are also cup shaped and have a pocket formed at their centers which pocket fits around the end of the shock absorber and the lock nut 60. The gaskets prevent transmission of vibration from the shock absorber to the frame.

The lower end of the spring 56 and shock absorber 58 are supported as follows: The axle housing 28, within which is located the drive axles 29, is provided adjacent each end with a spring seat 66 formed by stamping sheet steel stock into the required shape (see Figures 5 and 6). Each seat comprises a flat annular portion 68 against which the lower end of the spring 56 is adapted to rest. The side portions of the seats are provided with downwardly flanged portions 70 each of which is deformed into semi-cylindrical shape to provide seats 72 to fit against the cylindrical surface of the axle housing 28. Seats 72 may be welded or otherwise suitably secured to the axle housing 28. Within the annular spring seat 68, which it will be noted is offset with respect to the vertical plane containing the axis of the rear axle, the member 66 is centrally apertured and flanged upwardly as at 76 for the purpose of centering spring 56 and downwardly as at 79 to provide attaching lugs for a shock absorber support bracket 78. Support bracket 78, which is channel shaped in cross section, is secured by bolts 77 to the downwardly flanged seat portions 79 and has a central aperture for receiving the shock absorber anchoring stud 61. The shock absorber stud 61 is passed through a hole in the bracket 78 and provided with the rubber gaskets 62, one on each side of the bracket. The gaskets 62 are protected by the cup shaped washers 64 and the recessed washers 65, and the whole assembly is drawn down tight by means of the lock nuts 60 threaded on the end of the shock absorber stud 61 in the same manner as the connection at the top of the shock absorber. The fact that the spring and shock absorber are offset to the rear of the axle increases the distance between spring supports on the frame and allows the shock absorber to be lowered making room for a longer shock absorber.

By means of the foregoing construction I am able to use the simple channel shaped cross member 22 and the relatively long shock absorber 58 which gives a smoother action than shock absorbers having a shorter travel.

Since the coil spring 56 offers practically no resistance to side sway, I have provided the sway bar 80 (Figure 3) which is connected at one end to the bracket 82 and at the other end to the plate 84. These connections (see Figure 12) are similar to the connections on the ends of the shock absorbers and are provided with the same rubber gaskets 62 and metal washers 64 for preventing the transmission of vibration through the sway bar. The sway bar 80 is tubular and has each of its ends reduced in diameter to embrace studs 81 which are welded therein and extend therebeyond upon the axis of the sway bar.

The bracket 82 has a triangular flange 86 which is welded to the upper spring seat 42. The bracket 82 is also provided with a side surface 88 (Figure 5) to which the sway bar 80 is fastened and which is welded to the inwardly presented surface of the channel member 34. I have provided the surface 88 with the flange 90 parallel to triangular flange 86 for the purpose of strengthening the bracket.

The bracket 84 (see Figures 2, 3 and 7) has an end panel 92 which is welded to the outside flange 70 of the left lower spring seat 66. Panel 92 receives the connection of the sway bar 80 and is provided with a stiffening flange 94 which is bent at right angles with the surface 92 and is welded at its bottom portion to a flange 96 on a rear edge of the spring seat. With this construction any tendency of the wheels and axle housing to move laterally relative to the car frame is resisted by forces transmitted through the bracket 82, sway bar 80 and the bracket 84, such forces being thus transmitted from the axle to the frame. At the same time the wheels and the axle are not interfered with in passing over bumps or obstructions in the road.

I have also provided the brackets 98 which are welded to the bottom of the side members 20 over the axle housing 22. These brackets 98 serve to support rubber bumpers 100 which serve to limit the travel of the axle housing relative to the car frame and also take up some of the shock when the springs are compressed sufficiently to bring the axle housing in contact with the bumpers 100. The rubber bumper may be fastened to the bracket 98 by any suitable means such as the bolts 102. The bumpers 100 are tapered so as to resist movement of the axle housing with increasing force as the two members come together.

In the modification disclosed in Figures 8, 9 and 10, the parts which are unchanged from those disclosed in the first example of my invention are given the same numbers and serve the same purpose unless otherwise explained.

The U-shaped brackets 154 are fastened longitudinally of the cross member 22 and are provided with the bent out flanges 155 which are welded to the top surface of the cross member. In this manner they differ from the brackets 54 of the first example which were fastened transverse to the cross member. The brackets 142 which strengthen the connection between the side members 20 and the cross member 122 are of slightly different shape than the brackets 42 used in the first example in that their top surface 144 is not provided with any flanges around the opening 152. The brackets serve the same function of providing an upper seat for the springs 56, and the hole 152 is aligned with the hole 50 in the cross member 22 to receive the shock absorber 58. A fiber washer 153 is interposed between spring 56 and seat 144 to prevent metal-to-metal contact.

The lower spring seat 166, circular in outline, is provided with an annular raised portion 176 and a peripheral flange 170 which is deformed downwardly on opposite sides to provide semi-cylindrical portions to embrace the axle housing 28. The top of the raised portion 176 is provided with a central hemi-spherical depression 178, the lowest point of which rests on the top of the axle housing 28 when the seat is in place. The depression 178 also forms a seat for a ball 179 carried on the lower end of the shock absorber 58. The plate 166 is retained in place by means of a U-bolt 180 and the nuts 182. The U-bolt also serves to hold the upper socket-forming member 183 to the plate 166, member 183 being stiffened by flanges 185. The upper member 183 is shaped to fit around the upper half of the ball 179 and complete a spherical socket for retaining the ball 179 in position.

I have provided the annular rubber gasket 190 which fits between the spring 56 and the plate 166 and serves to dampen vibrations which would otherwise pass from the axle housing through the spring to the car frame. I have also provided the rubber gasket 192 which is spherical in shape and fits between the socket 178—183 and the ball 179. This gasket prevents the transmission of vibrations through the shock absorber. Both such gaskets act to prevent metal-to-metal contact in the connections between frame and axle.

The sway bar 80 is of the same type as in the first example of my invention but the connecting members are altered to fit the construction shown in Figures 8, 9 and 10. The bracket 188 is a simple channel member welded to the inner surface of the side member of the frame 20 while the bracket 184 is in the shape of a Z-bar and is fastened to the backing plate 186 of the brake 187 by means of the bolts 189. I have used the same type of connections between the sway bar and the brackets 188 and 184 as is described in the first example of my invention.

The lower spring seat 266 shown in Figure 11 is a stamping similar to the seat 166 shown in Figures 8, 9 and 10. It is provided with an annular outer ring 276 which is deformed where the ring touches the axle housing to form a semi-cylindrical surface in contact with the axle. Inside of the outer ring is a raised portion 277 in the center of which is formed the socket 278 for receiving the shock absorber ball 279. Around the edge of the raised portion 277 is formed the spiral step 280 which starts from the annular outer ring at 282 and rises in a spiral until it reaches the point 284 where it drops back to the point 282. The spiral step is shaped to fit the spiral of the spring 256 so that the bottom of the spring will have a continuous bearing surface without resorting to an expensive grinding operation to flatten the spring end. The seat 266 is provided with suitable rubber gaskets 290 and 292 the same as is seat 166.

It will be noted that in both examples of my invention which I have described, a simple straight cross member is used and the spring and shock absorber are so arranged as to be easily assembled and to occupy very little space. The position of the shock absorber also insures that the shock absorber will receive loads directly along its axis and provides for dissipating these loads through long travel of the shock absorber.

While I have described my invention in some detail, it is understood that this description is an example only and is not to be taken as limiting my invention to which I make the following claims.

I claim:

1. In a springing unit, an axle housing, a spring seat supported on said axle housing, a peripheral portion on said spring seat arranged to rest on said axle housing, a raised central portion on said spring seat forming a spring retaining shoulder, and a socket formed in the center of said raised portion to receive a shock absorber, said socket depending to the plane of said peripheral portion to abut against said axle housing.

2. In a suspension assembly, a frame having side members, a straight cross member having its ends supported upon said side members and defining an aperture near each end of said cross member, strengthening brackets fastened to the sides of said side members and the bottom of said cross member, said strengthening brackets forming spring abutments defining apertures aligned with said apertures in the ends of said cross member, and means carried by said cross member over said apertures forming an abutment for a shock absorber.

3. In a suspension unit, an axle housing, a spring seat having a spring retaining shoulder formed thereon, a lower socket formed in said spring seat within said spring retaining shoulder, an upper socket member cooperative with said lower socket to form a socket joint, and means for fastening said upper socket member to said spring seat, said means being adapted to hold said spring seat to said axle housing.

4. A spring seat having a central raised portion, a spiral step formed around said raised portion, a socket formed in the center of said raised portion, and saddle portions formed on the sides of said spring seat.

NILS ERIK WAHLBERG.